July 1, 1958
R. C. BAKER
2,841,006
PNEUMATIC GAUGING DEVICE
Filed April 23, 1954
2 Sheets-Sheet 1
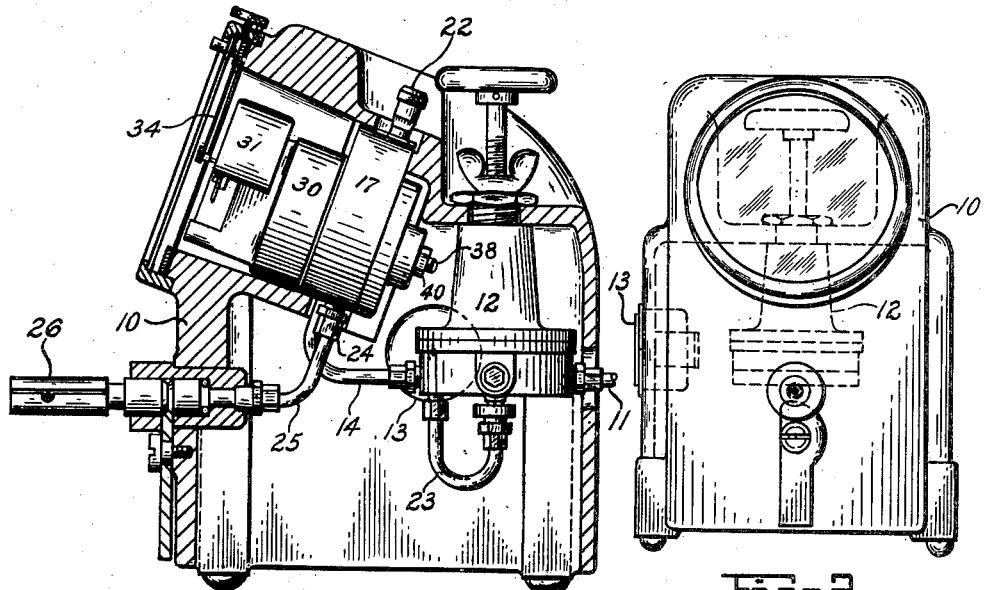
Fig-1
Fig-2
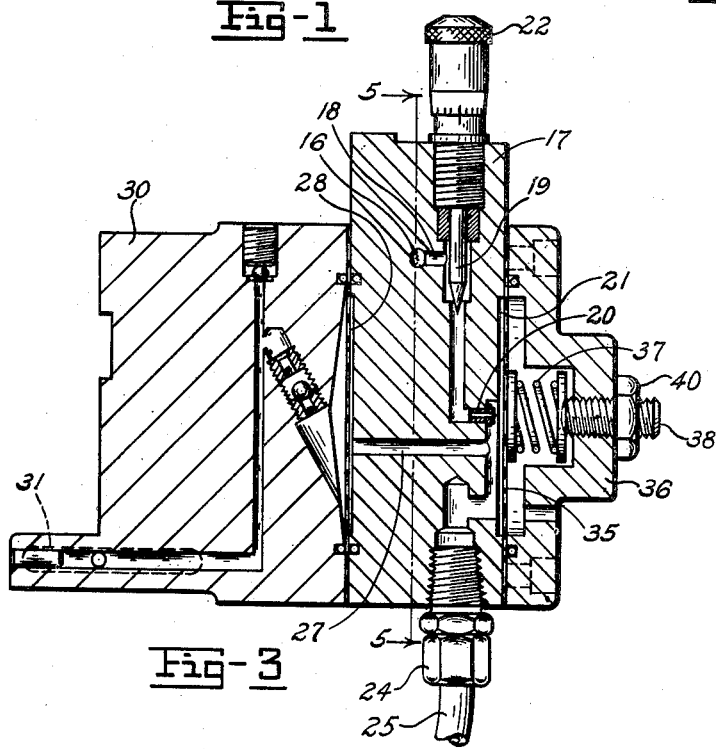
Fig-3
INVENTOR.
Ralph C. Baker
BY
Edward J. Noe Jr.
atty.

July 1, 1958     R. C. BAKER     2,841,006
PNEUMATIC GAUGING DEVICE

Filed April 23, 1954     2 Sheets-Sheet 2

INVENTOR.
Ralph C Baker
BY Edward T. Noif
atty.

United States Patent Office 2,841,006
Patented July 1, 1958

2,841,006
PNEUMATIC GAUGING DEVICE

Ralph C. Baker, Dayton, Ohio, assignor, by mesne assignments, to The Sheffield Corporation, a corporation of Delaware Application April 23, 1954, Serial No. 425,209

15 Claims. (Cl. 73—37.9)

This invention relates to a gauging apparatus and more particularly to an apparatus in which fluid pressures responsive to a gauged product characteristic are employed in gauging.

It is an object of this invention to provide such an apparatus for precision gauging wherein the response of a gauging means, such as an indicator or the like, is automatically controlled or modified to extend the range of linear response of the gauging means in gauging.

It is a further object to provide an air gauge wherein a gauging means responds to a fluid pressure as primarily determined by the gauged product characteristic and wherein an automatic flow restrictor has been provided for modifying the fluid pressure through at least a portion of the range of the gauging means to extend the linear range of response of the gauging means to the gauged product characteristic.

It is a further object to provide such an apparatus wherein fluid flow is materially less upon removal of the product being gauged whereby air consumption is economically reduced and a reduction in the noise level of the apparatus is achieved.

It is a further object to provide a product gauging apparatus comprising a fluid pressure chamber, the fluid flow out of which is controlled in accordance with the gauged product characteristic, and the flow into which is automatically controlled in accordance with the chamber pressure itself, the conjoint effects determining the pressure within the chamber to which a gauging means responds and in a manner whereby the linear range of the gauging means is extended and air consumption of the apparatus during non-gauging operations is reduced.

Figure 4:
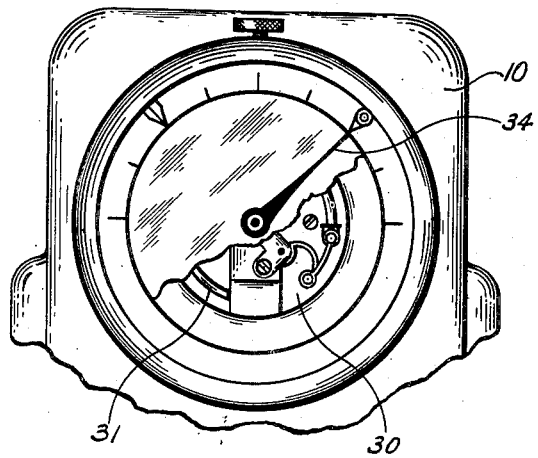
Figure 5:
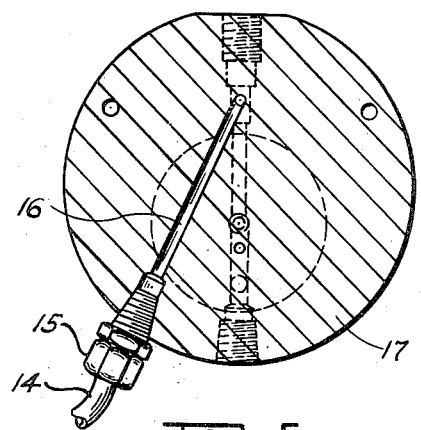
Figure 6:
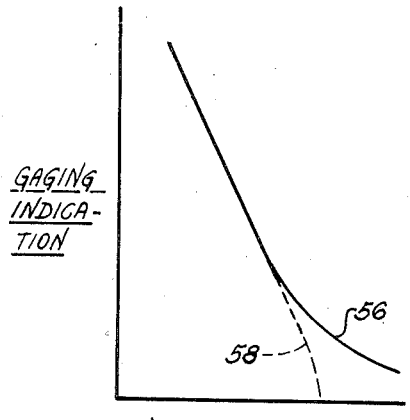
Figure 7:
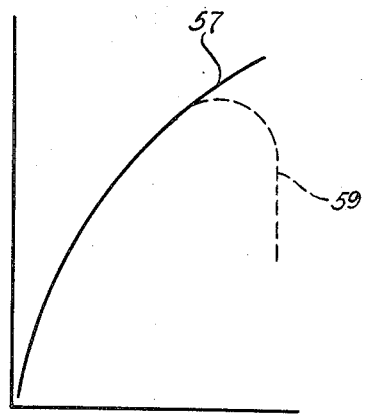
Figure 8:
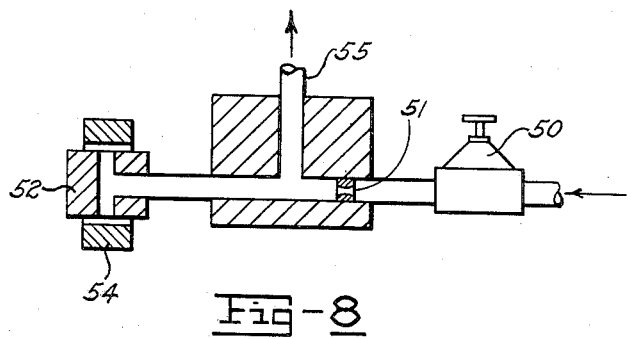

Other objects and advantages of the invention will be apparent from the following description, the appended claims and the accompanying drawings, in which, Figure 1 is a vertical central section of an apparatus embodying the present invention, Figure 2 is a front view of the apparatus of Figure 1, Figure 3 is a central section of the primary gauging components of the apparatus, Figure 4 is a view taken perpendicular to the dial face of the apparatus with a portion of the face broken away, Figure 5 is a sectional view on line 5—5 of Figure 3, Figures 6 and 7 are graphs showing the comparative performance between a conventional gauging system and the apparatus of this invention, and Figure 8 is a schematic representation of a conventional gauging system.

This invention has been illustrated as embodied in a pressure type air gauge for gauging a size characteristic of a part, although the invention obviously has various applications in the gauging of a product characteristic.

In the exemplary apparatus illustrated an indicator responds to a pressure which is primarily controlled by the air leakage through a gauge head as determined by the size of a part. In previous systems of this nature due to air flow characteristics the indicator has only had a limited range of linear response in gauging. With the apparatus of the present invention controlling means are provided which are automatically effective to modify the pressure to which the indicator responds to materially extend the indicator linear response range. The controlling means also serves to materially reduce air consumption when no part is on the gauge head thus making the apparatus more economical to operate and reducing its noise level.

In the gauging apparatus shown a cast housing 10 supports all the gauging components. Air is supplied from a suitable source through a conduit 11 and passes through an adjustable regulator 12 to a flexible conduit 14. Air from conduit 14 passes through a nipple connection 15 and into a passage 16 in an orifice block 17. Air from passage 16 is led through passage 18, past an adjustable restriction formed by needle valve 19 and through an orifice insert 20 into chamber 21 formed in orifice block 17. Needle valve 19 is adjusted by rotating knob 22 and this adjustment in conjunction with the adjustable regulator 12 determine the amplification of the apparatus. Air is led from chamber 21 through a nipple connection 24 and a conduit 25 to a suitable gauging head 26, illustrated as one comprising opposed leakage orifices for gauging the internal diameter of part holes. It will be appreciated that the conjoint relationship of the flow into the chamber through orifice insert 20 and the flow from the chamber through the conduit 25 will determine the gauging pressure within the chamber. A pressure gauge 13 mounted in the wall of housing 10 is connected through a conduit 23 to the regulator 12 and indicates its adjusted pressure.

The gauging pressure in chamber 21 is conducted through a passage 27 in orifice block 17 and acts upon the right hand side of a diaphragm 28. Deflections of diaphragm 28 in response to the gauging pressure are conducted through the passages of a mounting block 30 to an expansible chamber which moves in accordance with pressures applied to it. As shown this a Bourdon tube 31. Preferably both the Bourdon tube 31 and the passages in block 30 are completely filled with liquid down to diaphragm 28. The Bourdon tube 31 is effective through a suitable mechanical drive shown in fragment in Figure 4 to move or rotate an indicating pointer 34 along a calibrated dial.

The chamber 21 is completed by a diaphragm 35 which forms a movable wall at one side thereof. The diaphragm is formed by a suitable flexing member such as a bellows or a disc as illustrated. A constant predetermined pressure is maintained on the external wall of the diaphragm 35. This pressure is preferably exerted by an adjustable spring 37 carried in a spring cap 36. Spring 37 is seated between a first washer engaging the external face of the diaphragm and a second washer which is engaged by an adjustable set screw 38 locked in position by a nut 40. The opening of orifice insert 20 terminates in adjacent opposed relationship to the internal wall of the diaphragm. As diaphragm 35 flexes in response to the chamber pressure it will be effective to modify the flow through insert 20. Thus movable diaphragm 35 and the opening through orifice insert 20 provide a valve member and valve opening in a pressure responsive valve means for controlling flow through the circuit. This results in an automatic regulation of the pressure in chamber 21.

Figure 8 illustrates a simplified system such as has been heretofore used in gauging hole diameters. In such a circuit air is conducted from a suitable source through a regulator 50, an orifice restrictor 51, and a gauging head 52 where the flow is controlled in accordance with the internal diameter of a part 54. Changes in flow through the gauge head 52 will affect the pressure beyond the restrictor 51 in the system and an indicator or the like is connected to a passage 55 to sense these pressure changes.

In the graphs of Figures 6 and 7 the characteristics of the "standard" system of Figure 8 are indicated by the solid lines 56 and 57. The characteristics of the apparatus of this invention are indicated by broken lines 58 and 59.

In Figure 7 the air flow through the gauge head is plotted against work clearance. This is the distance the work is separated from the end of the nozzle or orifice that cooperates with the work. Line 57 of Figure 7 indicates that as the clearance between the part 54 and gauge head 52 of the "standard" system increases air flow correspondingly increases. With such a system the maximum air flow is of course when the work is removed from the gauge head, opening the gauging orifices. Line 59 shows by contrast the effects which the automatic regulation of this invention has upon air flow, the resulting air consumption and the noise of the apparatus when it is not gauging. At the minimum work clearance pressure in chamber 21 is at its maximum and the diaphragm 35 is most remote from the orifice 20. Accordingly for the initial range of work clearance the diaphragm 35 will not be within controlling proximity to the orifice 20 and the initial portion or curve 52 duplicates that of 57. However, with increasing work clearances flow out of chamber 21 increases and diaphragm 35 under the resilient bias of spring 37 moves against the decreased pressure within the chamber 21 to partially close off orifice 20 with a resultant drop in the air flow curve as indicated by the right hand portion of line 59 in Figure 7. Actually the flow will not cease entirely but the curve 59 will drop rapidly toward the zero air flow point and then level out and extend to the right. Of course when the work is removed the maximum reduction in flow results.

Figure 6 illustrates the characteristic response of the gauging indication for both the "standard" system (line 56) and the characteristic response of a system constructed in accordance with the present invention (line 58), both as plotted against work clearance. With the "standard" system of Figure 8 as work clearance increases after a predetermined linear response range the lower end of curve 56 curves more and more rapidly off to the right terminating the linear portion of the response. However with the present invention as the diaphragm 35 is held away from the orifice 20 at the higher chamber pressures is has no effect throughout the normal linear response range but as work clearance increases and the chamber pressure decreases the diaphragm 35 comes into effect and decreases flow into the chamber through orifice 20 to cause the lower end of the curve to drop at a rate that will offset the rise that would be present in the standard system. This serves to materially increase the linear response range as indicated by the line 58. Linear response is extremely desirable in gauging operations because of the increased accuracy and ease in reading. It also decreases the difficulty of calibrating the instrument.

In adjusting the apparatus the set screw 38 is adjusted to vary the pressure of spring 37 against the diaphragm 35. If this pressure it too light the responses of the apparatus approach those of the "standard" circuit of Figure 8. If it is too heavy the curve 58 will drop off too soon and the increase in linear response will not be achieved. However, at some intermediate point, which has not been found to be overly critical in actual operation, a maximum extension of the linear range is achieved.

Thus it is seen that through the apparatus provided a materially extended range of linear response in air gauging systems of this character has been achieved. A reduction in air consumption amounting to two-thirds in one actual practice example has also been accomplished giving more economical gauging operations. The objectionable hissing due to escaping gauging air when a part is not in gauging position has been materially reduced, resulting in less annoyance to the operator and ultimately in more efficient gauging.

While the form of apparatus herein described constitutes a preferred embodiment of the invention, it is to be understood that the invention is not limited to the precise form herein disclosed, and that changes may be made therein without departing from the scope of the invention which is defined in the appended claims.

What is claimed is:

1. A gauging apparatus comprising means providing a flow path adapted for connection at one end to a source of fluid under pressure, an outlet connection at the other end of said flow path adapted for connection to a gauging head, a restrictor in said flow path, a gauging means connected to said flow path and responsive to the pressure in the flow path at one point therealong downstream of said restriction, and an automatically controlled restriction means in said flow path between said gauging head connection and said restrictor including a movable flow controlling member subjected to the pressure changes at said one point along the flow path for varying the fluid flow through the flow path and modifying the response of the gauging means.

2. A gauging apparatus comprising means providing a flow path adapted for connection at one end to a source of fluid under pressure, an outlet connection at the other end of said flow path adapted for connection to a gauging head, a gauging means connected to said flow path at one point therealong, and an automatically operable controller in said flow path including a valve opening in the flow path and a flow controlling member cooperating with said opening and responsive to pressure changes in the flow path downstream of the opening effective when the flow through the gauging head is unrestricted by a workpiece to automatically reduce the fluid flow below that existing during gauging.

3. For use in an air gauge wherein a variable fluid pressure is obtained in a flow path in accordance with a gauged product characteristic, an apparatus comprising, means providing a chamber, inlet and outlet passages in closed communication with said chamber, the outlet passage being adapted for connection to a gauging head and the inlet passage including means for restricting the flow and being adapted for connection to a source of fluid under controlled pressure, gauging means responsive to the pressure within said chamber, the normal response of the pressure in the chamber to changes in flow through the gauging head having a linear range and a terminal non-linear range, and an automatically operable controller in communication with said chamber including a movable flow controlling member subjected to the pressure therein for effectively controlling the fluid flow to modify the normal pressure response only in the nonlinear range and cooperating with the gauging head to control the chamber pressure and the response of the gauging means.

4. Gauging apparatus for gauging product characteristics by gauging air flow comprising, means providing a chamber, an inlet passage leading to said chamber and adapted for connection to a source of air under regulated pressure, means for restricting air flow through said inlet passage, an outlet passage leading from said chamber and adapted for connection to a gauging head, whereby the pressure in said chamber is responsive to the flow through the gauging head, gauging means connected to said chamber and including a movable member responsive to the pressure in said chamber, and an automatically operable controller including valve means having a controlling member in communication with and responsive to the pressure in said chamber for effectively reducing flow through the inlet passage and into the chamber only through a predetermined range of reduced chamber pressures to modify the response of the movable member and the gauging means.

5. Gauging apparatus for gauging product characteristics by gauging air flow comprising, means providing a chamber, an inlet passage leading to said chamber and adapted for connection to a source of air under regulated pressure, means for restricting air flow through said inlet passage, an outlet passage leading from said chamber and adapted for connection to a gauging head whereby the pressure in said chamber has a normal response curve which has a linear portion and a terminal non-linear portion, gauging means comprising a dial indicator operatively connected to said chamber responsive to the pressure therein and calibrated in terms of the product characteristic, and an automatically operable controller including valve means having a controlling member in communication with and responsive to the pressure in said chamber for controlling the flow through said inlet passage without effect during a large portion of the normal chamber pressure response curve but becoming increasingly effective in a non-linear terminal portion as the chamber pressure decreases to control the flow through the inlet passage and modify the chamber pressure to extend the linear range of chamber pressure and indicator response.

6. An apparatus for gauging product characteristics by controlled air flow, said apparatus comprising: means providing a chamber, said means comprising a flexible diaphragm forming one wall of said chamber, means providing an orifice opening within said chamber in adjacent opposed relationship to the internal wall of said diaphragm, an inlet passage leading to said orifice opening and adapted for connection to a source of air under regulated pressure, means for restricting flow through said inlet passage, an outlet passage leading from said chamber and adapted for connection to a gauging head whereby the flow from said chamber is controlled by the product gauged, means to so bias the diaphragm against the chamber pressure and toward the orifice opening that the diaphragm is effective to vary the flow through the orifice only at reduced chamber pressures and when the gauging head is least restricted, and gauging means connected to said chamber and responsive to the pressure therein, whereby the response of said gauging means is determined conjointly by the flow out of said chamber and through the gauging head as controlled by the product gauged and the flow into said chamber and through the orifice opening as controlled by the flexing of the diaphragm.

7. Gauging apparatus for gauging product characteristics by gauging air flow comprising, means providing a chamber including a diaphragm forming one wall thereof, an inlet passage leading to said chamber and adapted for connection to a source of air under regulated pressure, means for restricting air flow through said inlet passage, an outlet passage leading from said chamber and adapted for connection to a gauging head whereby the pressure in said chamber is responsive to the flow through the gauging head, means providing an air leakage orifice at the terminal end of said inlet passage situated adjacent and in opposed relationship to a central portion of the internal side of the flexible diaphragm and controlled thereby to vary the rate of flow from the orifice in accordance with the change in chamber pressure, means to so bias the diaphragm against the chamber pressure and toward the orifice opening that the diaphragm is effective to vary the flow through the orifice only at reduced chamber pressures and when the gauging head is least restricted, a movable member connected to said chamber and responsive to the pressure therein, and an indicating means including a calibrated dial and an indicator pointer, said pointer being connected to said member and responsive to movements thereof, whereby the movements of the pointer are conjointly controlled by the flow from the chamber and through the gauging head and the flow into the chamber and through the orifice.

8. An apparatus for gauging product characteristics by controlled air flow, said aparatus comprising: means providing a chamber, said means comprising a flexible diaphragm forming one wall of said chamber, means providing an orifice opening within said chamber in adjacent opposed relationship to the internal wall of said diaphragm, an inlet passage leading to said orifice opening and adapted for connection with a source of air under regulated pressure, means for restricting air flow through said inlet passage, expansible means connected to said chamber and responsive to the pressure therein, a dial indicator including a pointer, means operatively interconnecting said pointer and said expansible means, an outlet passage leading from said chamber and adapted for connection to a gauging head whereby the flow from said chamber is controlled by the product gauged, and means to so bias said diaphragm toward the orifice opening that the diaphragm is ineffective to control flow through the opening during the major portion of the normal gauging range but becomes effective upon an unrestricted flow condition through the gauging head beyond a predetermined range of the dial indicator and when the chamber pressure is at a minimum to decrease air flow below that obtaining in gauging.

9. An apparatus for gauging product characteristics by controlled air flow, said apparatus comprising: means providing a chamber, said means comprising a flexible diaphragm forming one wall of said chamber, an inlet passage leading to said chamber and adapted for connection to a source of air under regulated pressure, an adjustable flow restrictor in said inlet passage, an outlet passage leading from said chamber and adapted for connection to a gauging head whereby the pressure in said chamber has a normal response curve which has a linear portion and a terminal non-linear portion, means providing an air leakage orifice at the terminal end of said inlet passage situated adjacent and in opposed relationship to the central portion of the internal side of the flexible diaphragm, a movable member connected to said chamber and responsive to the pressure therein, an indicating means including a calibrated dial and an indicating pointer, said pointer being connected to said member and responsive to the movements thereof, and an adjustable means exerting a predetermined pressure on the external side of said diaphragm whereby the diaphragm is displaced from the orifice and is ineffective to control the flow therethrough during a large portion of the normal chamber pressure response curve but approaches the orifice as the chamber pressure decreases and becomes increasingly effective through a non-linear terminal portion of the normal response curve to control the flow through the orifice and into the chamber to modify the chamber pressure and extend the linear range of chamber pressure and indicator pointer response.

10. An apparatus for gauging product characteristics by controlled air flow, said apparatus comprising: a flexible diaphragm, first and second housing sections clamped about the periphery of said diaphragm, a first of said housing sections providing a chamber in sealed relationship with said diaphragm, means providing an orifice situated centrally in said first housing section in opposed relationship to the internal face of said diaphragm, an inlet passage in said first housing section leading to said orifice and adapted for connection to a regulated source of air under pressure, an adjustable flow restrictor in said inlet passage, an outlet passage leading from said chamber and adapted for connection to a gauging head whereby the flow from said chamber is controlled by the product gauged, adjustable means in said second housing section bearing against the external face of the diaphragm to so bias the diaphragm against the chamber pressure and toward the orifice opening that the diaphragm is effective to vary the flow through the orifice only at reduced chamber pressures and when the gauging head is least restricted, and gauging means connected to said chamber and responsive to the pressure therein, whereby the response of said gauging means is determined conjointly by the flow out of said chamber and through the gauging head as controlled by the product gauged and the flow into said chamber and through the orifice opening as controlled by the flexing of the diaphragm.

11. A gauging apparatus comprising means providing a flow path adapted for connection at one end to a source of fluid under pressure, an outlet connection at the other end of said flow path adapted for connection to a gauging head, a restriction at one point along said flow path, and valve means in said flow path responsive to the pressure between the restriction and gauging head connection, said valve means including a pressure responsive movable member in communication with the flow path and subjected to pressures existing at the outlet connection operable to open the valve means at high pressures and restrict the valve means at low pressures for automatically reducing fluid flow through said flow path when the flow through the gauging head is unrestricted.

12. A gauging apparatus comprising means providing a flow path adapted for connection at one end to a source of fluid under pressure, an outlet connection at the other end of the flow path adapted for connection to a gauging head, gauging means responsive to flow through the flow path, an automatically operable controller in said flow path, said controller including a movable flow controlling member subjected to pressure in the flow path and urged in a flow increasing direction thereby, and means operative to bias the flow controlling member in the opposite direction whereby when the flow through the gauging head is unrestricted between gauging operations the fluid flow is automatically reduced below that existing during gauging.

13. A gauging apparatus comprising means providing a flow path adapted for connection at one end to a source of fluid under pressure, an outlet connection at the other end of the flow path adapted for connection to a gauging head, gauging means responsive to flow through the flow path, an automatically operable controller in said flow path, said controller including means providing an orifice opening and a diaphragm movable relative thereto to control flow through the opening, means subjecting one side of the diaphragm to pressure in the flow path urging the diaphragm in one direction away from the outlet, the opposite side of the diaphragm being subjected to atmospheric pressure, and spring means urging the diaphragm in the opposite flow decreasing direction whereby when the flow through the gauging head is unrestricted by a workpiece fluid flow is automatically reduced below that existing during gauging.

14. For use in a gauging system, a flow controlling apparatus comprising means providing a flow path adapted for connection at one end to a source of fluid under pressure, an outlet connection at the other end of said flow path adapted for connection to a gauging head, pressure responsive valve means including a valve opening in said flow path, a movable member responsive to pressure downstream of said opening in flow controlling relationship with said opening, and means biasing said member toward flow restricting relation with said opening, whereby when flow through the gauging head is unrestricted the flow through the flow path is automatically reduced.

15. An apparatus as set forth in claim 14 wherein said movable member includes a flexible diaphragm in sealed relation with said flow path and said biasing means includes spring means and adjustment means therefor.

References Cited in the file of this patent

UNITED STATES PATENTS

| | | |
|---|---|---|
| 2,356,970 | Brockett | Aug. 29, 1944 |
| 2,471,737 | Fox | May 31, 1949 |
| 2,486,052 | Moore | Oct. 25, 1949 |
| 2,556,436 | Moore | June 12, 1951 |
| 2,686,424 | Aller | Aug. 17, 1954 |
| 2,706,397 | Byrkett | Apr. 19, 1955 |

FOREIGN PATENTS

| | | |
|---|---|---|
| 627,056 | Great Britain | July 27, 1949 |
| 705,177 | Great Britain | Mar. 10, 1954 |